Figure 1:
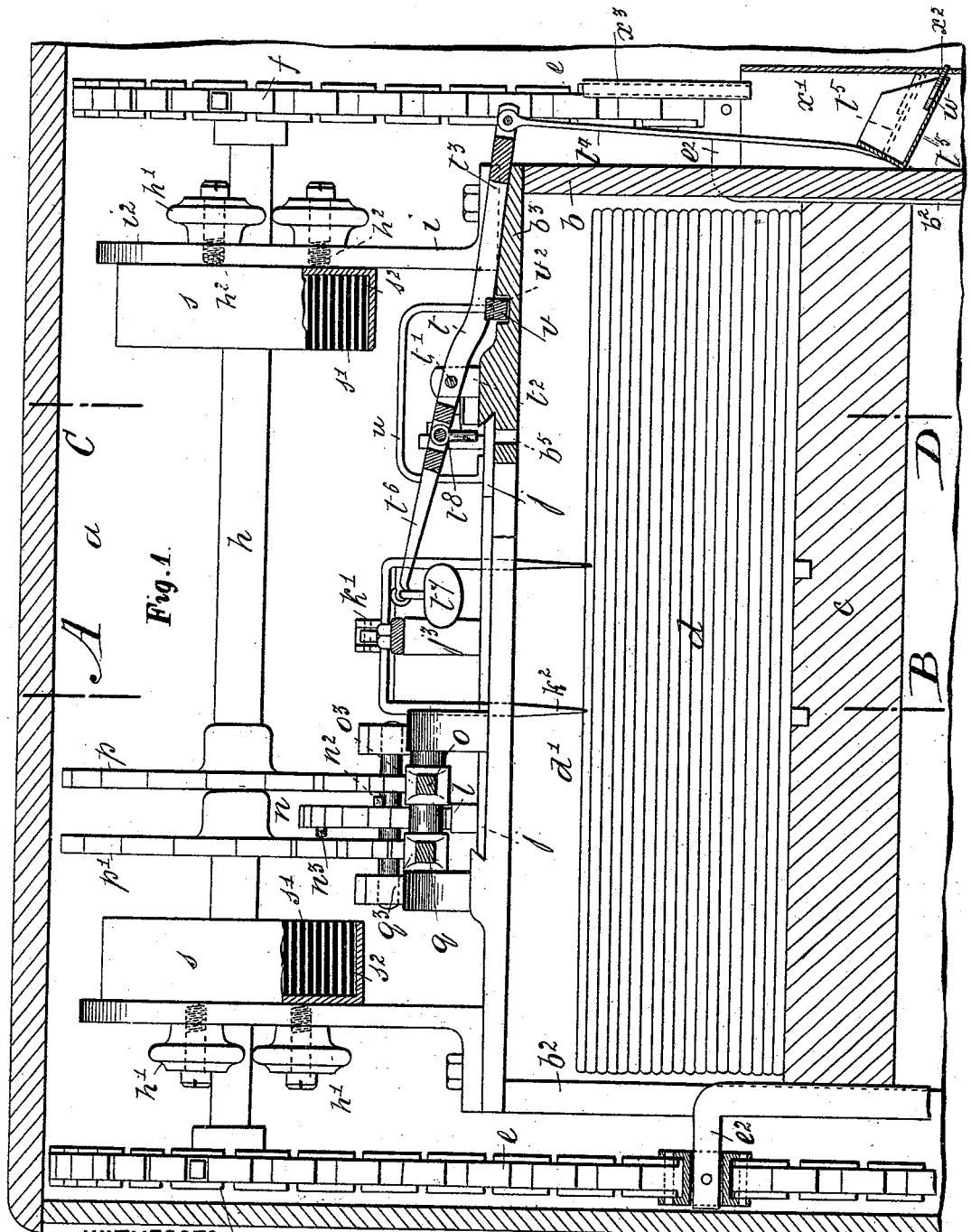

(No Model.) 4 Sheets—Sheet 1.

G. SALTER & J. HUGHES.
COIN FREED MACHINE FOR THE AUTOMATIC SALE OF NEWSPAPERS.

No. 494,444. Patented Mar. 28, 1893.

WITNESSES
Henry C. Kerrett
Arthur S. Padeer

INVENTORS
Geo. Salter
John Hughes.

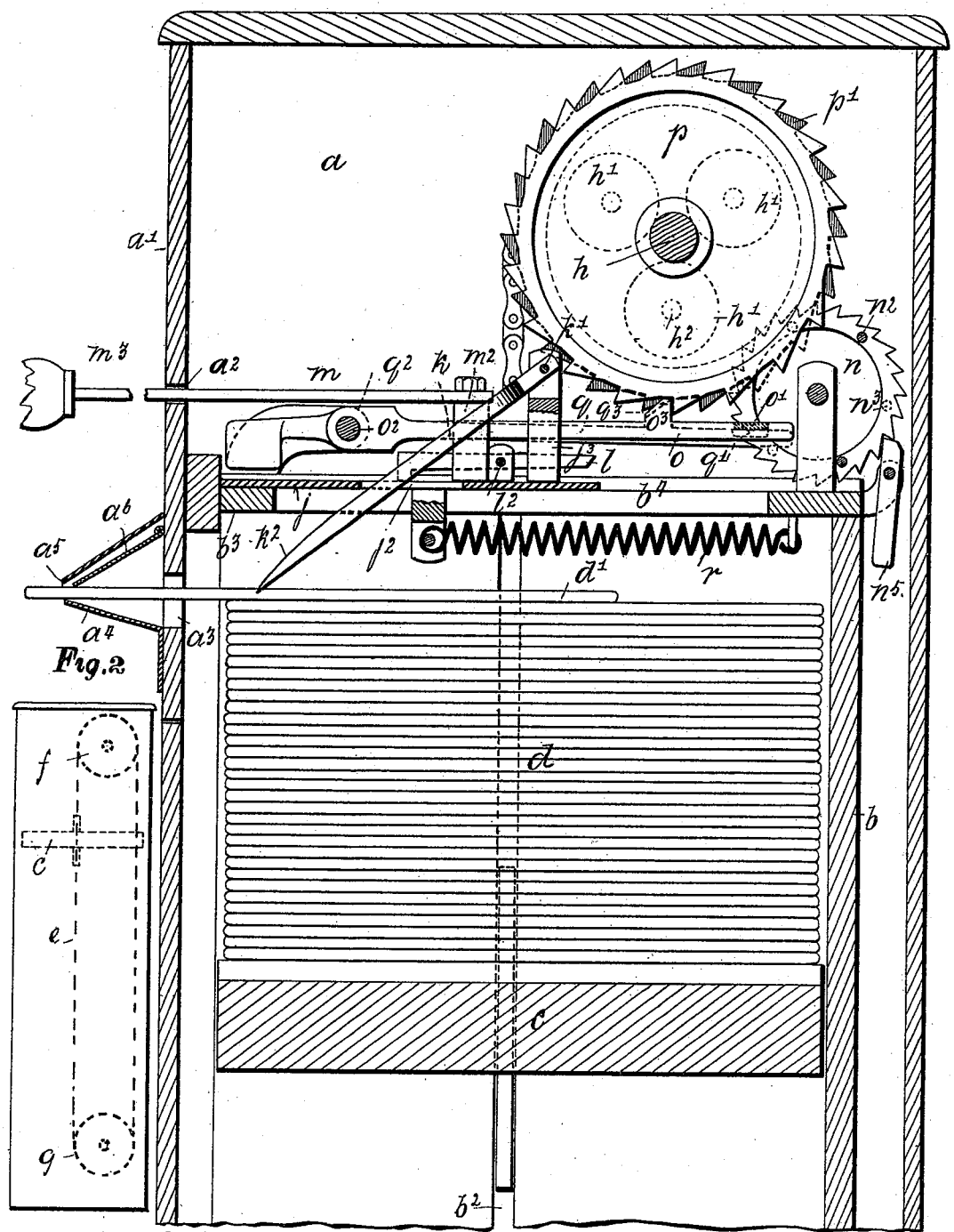

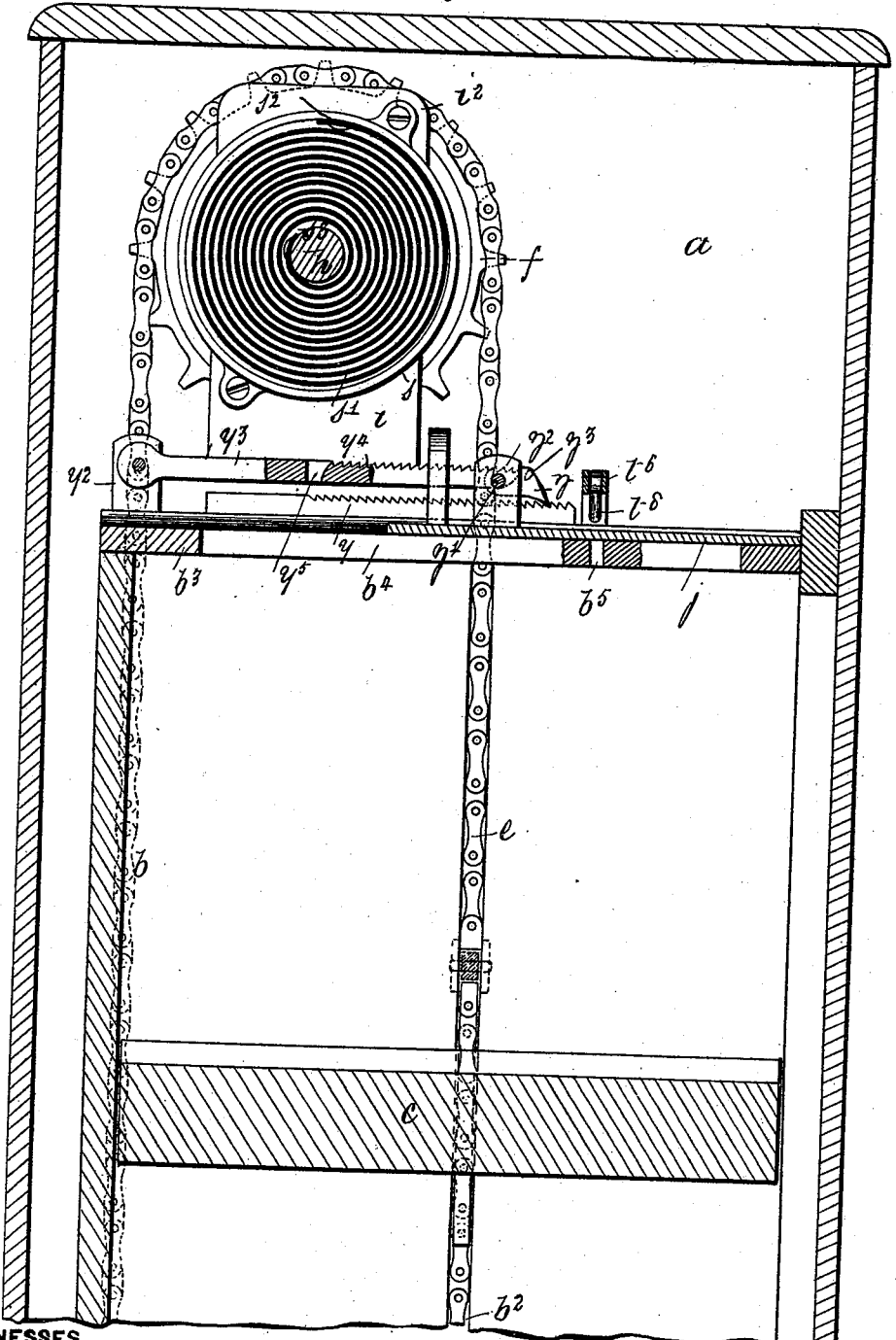

(No Model.) 4 Sheets—Sheet 4.
G. SALTER & J. HUGHES.
COIN FREED MACHINE FOR THE AUTOMATIC SALE OF NEWSPAPERS.
No. 494,444. Patented Mar. 28, 1893.
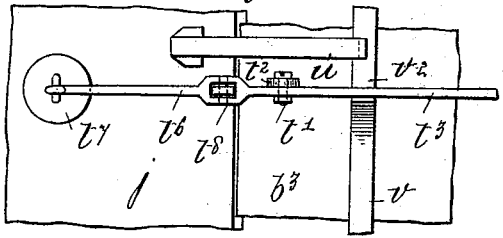
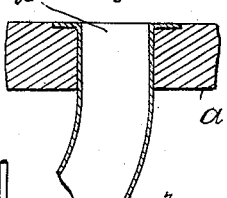
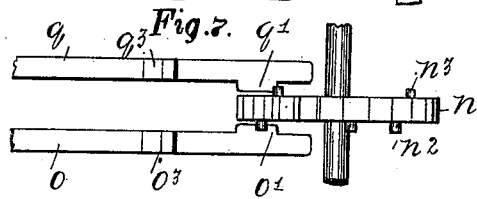
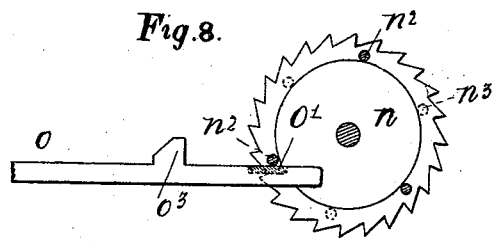
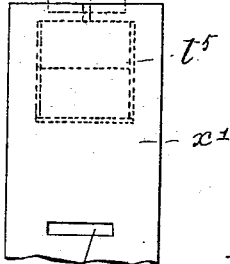
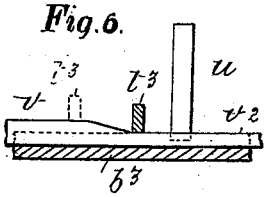
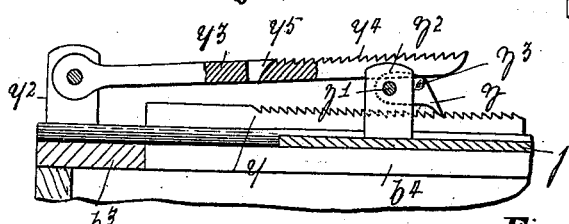
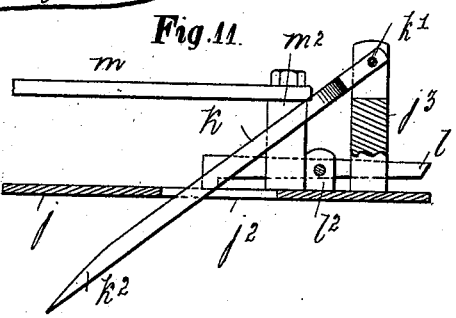
WITNESSES
Henry Sherrett
Arthur J. Sadler
INVENTORS
Geo. Salter
John Hughes.

UNITED STATES PATENT OFFICE.

GEORGE SALTER AND JOHN HUGHES, OF WEST BROMWICH, ENGLAND.

COIN-FREED MACHINE FOR THE AUTOMATIC SALE OF NEWSPAPERS.

SPECIFICATION forming part of Letters Patent No. 494,444, dated March 28, 1893.

Application filed June 1, 1892. Serial No. 435,192. (No model.) Patented in England December 24, 1891, No. 22,510.

*To all whom it may concern:*

Be it known that we, GEORGE SALTER and JOHN HUGHES, subjects of the Queen of Great Britain, residing at West Bromwich, in the county of Stafford, England, have invented certain new and useful Prepayment Coin-Freed Machines for the Automatic Sale and Delivery of Newspapers, Periodicals, and the Like, (for which we have received Letters Patent of Great Britain, dated December 24, 1891, No. 22,510;) and we do hereby declare the following to be a full, clear, and exact description of the invention, reference being had to the accompanying drawings, which form part of this specification.

This invention pertains to prepayment coin-freed machines, for the automatic sale and delivery of newspapers, periodicals, journals, magazines and the like. A machine, when in operation, delivers the said articles consecutively from a pile, resting upon a rising and falling elevator table, located and moving within an inclosed framing, as hereinafter described.

Figure 1 of the accompanying drawings represents in transverse vertical section, the upper portion of a prepayment coin-freed machine or apparatus for the automatic sale and delivery of newspapers, periodicals, journals, magazines, books and the like, constructed, arranged, fitted and provided according to our invention. It will be seen that that part of the machine carrying the papers or the like, is separately inclosed from the other part, or that part carrying the feeding mechanism, stop-arrangements, releasing means, slides, pulls and other mechanical factors constituting cognate parts of the general mechanism of the machine. Fig. 2 shows upon a reduced scale, a side elevation of the whole of the machine or apparatus. Fig. 3 represents a transverse vertical section of the upper portion of the said machine and upon the dotted lines A B Fig. 1, and looking from the right-hand side to the left hand side, this view, besides showing more clearly the disposition of the working parts and of the means employed for the carrying, vertical feeding, and delivery of the articles, also shows the dispositions of the paper and mechanism inclosing casings. Fig. 4 also represents a transverse vertical section of the said upper part, but upon the dotted lines C D Fig. 1, looking from left to right; the feed inclosing drum casing of one of the lifting springs is shown in elevation, and so also is the fraud preventing device. Fig. 5 shows a plan of a portion of the slide, with a coin-freeing bar connected with it. The outer end of the bar is cut away, for allowing the coin-lever to make a final drop to free the coin deposited, and this can only be done by the pulling forward of the slide and bar connected by the pull-handle. Fig. 6 shows a side view of the coin-freeing bar, and the coin lever across it at the reduced part. Fig. 7 shows a plan of the stud wheel, and stop and releasing arms of feed. Fig. 8 is a side elevation of Fig. 7. Fig. 9 is the fraud-preventing means, with the pawl catch, traveling toward the gate of the appliance, and at the same time lifting the jointed and top member. Fig. 10 shows partly in elevation, and partly in section, the throat of the coin-chute leading from the slot, and also the rest-box of the coin tray. Fig. 11 shows the slide, and those parts of the feed appliances carried by it.

The same letters of reference indicate corresponding parts in the several figures.

$a$ is a four-sided and pillar shaped outer casing, adapted to inclose both the acting or operating mechanism of the machine, and also an inner and upright rectangular shaped casing $b$, adapted to contain a pile of closely folded papers or a pile of books or like matter $d$, $d'$, resting upon a rising and falling hoist table $c$, disposed across, and sliding freely within the inside boundary walls of the said inner casing $b$. Connected to the said table $c$, through the intervention of crank-ended rods $e^2$, which extend and work through vertical slots $b^2$, up the middle of casing $b$, are endless chains (cords, ropes, bands or the like) $e$, disposed at the two opposite sides of the inner casing, and taking over upper and lower chain wheels $f$, $g$, the former made fast to and carried at both ends of, a main axis $h$, supported and turning in roller bearings $h'$, mounted and turning freely upon pins $h^2$, carried by the upper middle parts $i^2$, of erect brackets or holsters $i$, connected to, and carried on the bed or top $b^3$ of, the inner casing b. The lower chain wheel $g$, is simply carried by a fixed axle, working within ordinary fixed bearings carried by the lower part of the framing.

Fitted and sliding upon the top side of the bed $b^3$, which has a long slot $b^4$, directed through it, and passing nearly from front to back of the casing $b$, is a slide $j$, pierced with a long slot $j^2$, and carrying upon its top side, an upright bracket $j^3$, to the upper end of which an inclined delivery-fork or bifurcated pawl arm $k$, is connected and jointed at $k'$, and with the middle part of the said fork passing through a slot $j^2$, and its lower and pointed end $k^2$, coming upon the top side of, and sticking into the paper or book $d'$, being delivered, of the pile $d$. The said slide $j$, also carries a jointed and rear counterpoised push-pawl $l$, connected to the upper part of an upright bracket $l^2$, and also a straight pull rod $m$, affixed at its after end to the top of the bracket $m^2$, while the fore and handle part $m^3$, of the said rod, passes outwardly through a hole $a^2$, in the front $a'$, of the outer casing $a$. The prong ends of the delivery fork, by their raking position, wipe pawl-like over the papers or books in its retiring movement, and sticks slightly into them, in advancing, and slightly changes its angle between the delivery of each paper or book, during each intermittent vertical feed of the hoist table, occasioned by the releasing of a tooth of the hoist feed wheels, as hereinafter described.

The duty of the push-pawl $l$, is to push back the stud or pilot wheel $n$ (which is in its path of motion) one tooth, to each back movement made by the slide, and as this stud-wheel has twenty four teeth, and three equidistant and intermediate positioned studs $n^2$, $n^3$, upon each side, then on the slide being pushed back four times, and the stud wheel impinged against, the same number of times, one of the studs $n^2$, is made to operate against the winged end $o'$, of the near side stop and releasing counterpoised arm $o$, jointed at $o^2$, and having a tooth $o^3$, which engages consecutively behind the shoulders of the teeth of a near side hoist feed wheel $p$, made fast upon the main axis $h$.

On the other side of the stud wheel $n$, which turns within bearings of an upright bracket, carried by the bed of the inner casing, is a second counterpoised stop and releasing arm $q$, having (like the former arm $o$) a free end $q'$, jointed at $q^2$, and a tooth $q^3$, adapted to engage with a tooth of a second hoist feed wheel $p'$, also made fast on the main axle, and with its teeth coming midway between the teeth of the wheel $p$, that is to say, the points of the teeth of the wheel $p$, come equidistantly between the points of the teeth of the wheel $p'$, so that as the tooth of the arm $o$, is released from a tooth of the wheel $p$; the tooth of the arm $q$, then engages within a tooth, or at the back of a tooth of the wheel $p'$, hence shock and non-engagement are prevented, as would be otherwise the case if only a single toothed wheel were employed, as the sudden disengagement of the arm from the tooth of a wheel would be so momentary, that there would be insufficient time for a second arm to take the place of the first, and so give the required feed. It may be observed that the said arms $o$ and $q$, are jointed to uprights carried by the fixed framing or bed of the inner casing, and that the slide which carries the pawl-acting delivery fork, is pulled back by a spring $r$, which is distended by the pulling out of the rod end, on the delivery of a paper, book or like matter.

Carried upon the inner side of each of the upright framings $i$, is a drum $s$, inclosing a volute and vertical hoist spring $s'$, for the feeding or bringing up of the hoist table, after every four papers or books have been delivered through an aperture $a^3$, in the front $a'$, of the outer framing $a$. The outer end of the said spring is connected at $s^2$, to the said fixed drum $s$, while the inner end $s^3$, of the spring, is connected to the rotating shaft $h$, so that as the said shaft is rotated, by the pulling of the chain in the direction as indicated by the full arrow, the springs of both ends of the shaft are wound up, by the pressing down of the hoist table, prior to the placing of the pile of papers or books upon it. The releasing of the feed wheels, and the consequent rotation of the shaft, through the uncoiling of the wound-up springs, turns the chain wheels in reverse directions, and pulls the chains up in the direction of the dotted arrow, which lifts the hoist table to the extent of four papers or books at each feed, and brings the top paper or book alignable with the top part of the paper delivery aperture $a^3$, which is of the length of the papers or books to be delivered, and of a depth equal to the thicknesses of four papers or books, and which delivery aperture, has in front of it, a conical mouth $a^4$, with an issuing orifice $a^5$, and an inside hinged flap $a^6$, which normally closes the issuing orifice $a^5$, when no paper is being delivered, and by which flap, papers are prevented from being clandestinely extracted without being paid for.

It may be observed that the springs are wound up to their greatest tension when the hoist table is at its lowest position, and are weakest when the said hoist table is at its highest position, and the said springs are of such a power that they more than counterbalance the weight of the whole of the pile of papers, to an extent sufficient to raise the said papers and table, when the vertical feed arrangements are liberated. Thus, the surplus power of the springs, above that required for counterbalancing, is employed as a motive power for the raising of the table. The stud or pilot wheel is caught or prevented from running back by a weighted pawl $n^5$.

Disposed at the right hand side of the topside of the bed, is a counterpoised coin lever $t$, jointed at $t'$, to a carrying bracket $t^2$, and with the fore arm $t^3$, connected with a suspension rod $t^4$, terminated at its lower end by a coin tray $t^5$. The after end $t^6$, of the said coin lever is weighted at $t^7$, while the said after part lever, rear of the joint, has a swinging peg $t^8$, which normally rests at the front of the slide $j$, and within a hole $b^5$, in the bed $b^3$, of the inner casing $b$, so that the said peg has to be lifted by an inserted coin, before the slide $j$, is liberated, and when liberated, the said slide can be pulled forwardly by the pull bar $m$, as before stated. Connected to the said slide, by a bridge $u$, is a coin-freeing bar $v$, with cutaway part $v^2$, which moves with the slide, and is drawn under the arm $t^2$ of the coin lever $t$, and on the said coin lever dropping, or passing onto the reduced part $v^2$, the said arm makes a further back motion, and gives a final drop to the coin tray $t^5$, which brings its inclined bottom, obliquely alignable with a delivery hole $x^2$, of a tray box $x'$, leading from a throat $x^3$, of a coin slot $x$, and by such final drop, the coin $w$, is slid into a coin chest.

To prevent fraud, or the movement of the slide for the delivery of a number of papers for a single coin, $y$ is a rack, carried on the bed of the inner frame, and hung immediately above it, upon a bracket $y^2$, attached to the said fixed framing of the inner casing, is a jointed rack bar or top member $y^3$, having teeth upon its top side $y^4$, raking in a reverse direction to the teeth on the lower and fixed bar $y$, while carried by a bracket $z^2$, carried by, and moving with the slide $j$, is a pawl catch $z$, jointed at $z'$, and having a snug $z^3$, upon one side, which is adapted to traverse on the underside of the member $y^3$, lift the same, and pass through the gate $y^5$, from the underside to the top side in making an orbicular movement around the front part of the said top member. Thus, the rack members are stationary with respect to the slide, while the upper one is lifting, and as the slide is drawn forward for delivery by the pull bar, the nose of the weighted pawl $z$, wipes over the teeth of the lower rack bar, and the snug $z^3$, lifts the upper rack bar, and immediately the said snug comes opposite the gate $y^5$, it passes through it, the top rack-member falls, and on the slide being brought back by the contraction of the coiled spring $r$, on the pull bar being released, the said snug of the pawl $z$, is pushed in a wiping manner over the teeth $y^4$, until the snug falls over the rounded end of the said top member, when a like action as described is repeated.

Operation: Assuming that the hoist table is empty, then by opening a door in the front of the outer casing, the papers are deposited within the interior of the inner casing through an open front, and as the papers, books or other matters are placed pilewise, the hoist table is lowered, until the same has been pressed down to its lowest position, when the volute springs, through the intervention of the endless chains, are wound up, and are retained in their wound up conditions by the engagement of the teeth $o^3$, $q^3$, respectively, with the hoist feed wheels $p$, $p'$, which are fast on the axis $h$. Thus, the springs connected to the hoist table carrying the papers or books, through the medium of the endless chains, lift the said table when released. By now placing a coin within the slot, the coin rolls down the throat of the same and lodges upon the tray $t^5$, when the coin lever is rocked upon its center, the swinging peg $t^8$, lifted from in front of the slide $j$, and the arm $t^3$, of the said lever lowered, so as to bring the tray into the position as represented in dotted lines. As the peg is now out of the path of the slide, the pulling forward of the pull bar $m$, by the pull end $m^3$, pulls forward the slide $j$, and with it, the parts carried upon and by it, and also the coin freeing bar $v$, and moves the same under the arm $t^2$, of the coin lever $t$, which immediately falls, on the same coming over the cut-away part $v^2$, hence the final drop to the coin tray, and the getting rid of the coin. By the end of the delivery fork puncturing or sticking into the top paper or book $d'$, of the pile $d$, the said paper is slid forwardly, and passed forwardly through the opening $a^3$, then lifting the jointed flap $a^6$, and from thence being guided through, and extending itself beyond, the orifice $a^5$, of the conical mouth $a^4$, when the said projecting part of the paper is laid hold of, and finally withdrawn by the payee. Thus, by the traverse of the delivery fork or pawl arm, papers are delivered consecutively and intermittently from a pile, on coins being deposited intermittently for each and every paper to be withdrawn. By now releasing the pull bar, the slide, delivery fork, and parts carried by the slide, are returned to their normal positions by the contraction of the spring $r$, which was distended by the act of drawing the slide by the pull bar. This back traverse of the slide, on nearly reaching home, takes the nose of the push pawl $l$, against a tooth of the idle stud wheel $n$, and pushes the said idle stud wheel back to the extent of a tooth, which is retained by a pawl $n^5$. By passing another coin through the coin slot and repeating the same movements as described, four times, a right hand stud $n^2$, of the idle stud wheel $n$, is, on the fourth rear traverse of the slide, made to impinge upon the wing $o'$, of the catch and releasing bar $o$, and tip the said bar downward, so as to take the tooth $o^3$, below the periphery of the wheel $p$, when the said wheels $p$, $p'$, each move round to the extent of half a tooth, while the wheel $p'$, is caught by the engagement of the tooth $q^3$, with the tooth of it, hence the alternate in and out of tooth of the teeth $o^3$, $q^3$. The movement of half a tooth rotates the shaft, and with it, the chain wheels, and through them the lift table $c$, is raised, to the extent of four papers or books, through the paying out of a portion of the wound up spring. This is repeated after the intermittent introduction of every four coins, when one of the studs $n^3$, on the other side of the idle stud wheel $n$, is made to act upon the end $q'$, of the arm $q$, and take its tooth $q^3$, from the back of a tooth of the wheel $p'$, when the said wheels $p, p'$, are again rotated by the springs to the extent of half a tooth, and with the tooth $p$, now being caught again by the tooth $o^3$. This operation is repeated, and the feed intermittently conducted, until the whole of the papers have been delivered from the machine. It will also be understood that the coin lever peg or catch $t^8$, takes its position at the back of the slide, when it is in a position for it to do so, and after the coin $w$, has slid from the tray $x^2$.

Instead of the intermittent feed coming into operation at every four papers as described it may come into operation at every one, two or more papers, books or the like, if the stud wheel be arranged with studs to correspond with the required feed. Thus, if the feed is to be for every paper, then the number of studs will be equal to the number of teeth, and further, if the intermittent feed is to operate on every two papers being delivered, then the number of studs will be half that of the number of teeth on the periphery, and so on.

Having thus described our invention, what we desire to claim as new is—

1. In the feed part of an automatic prepayment coin freed machine for the delivery of newspapers, periodicals, books and other like printed matter, a rising and falling hoist table, located and working transversely within a pillar like casing, and with the articles to be intermittently delivered, resting upon the topside of the same, in combination with a pawl like jointed arm or arms adapted to engage with and project the articles forward, a reciprocating slide upon which said jointed arm is mounted, a pull rod mounted on said slide and projecting through the casing mechanism substantially as described for automatically elevating the hoist table, a coin receiving chute and detent mechanism released by the weight of a coin such detent mechanism being constructed and adapted to normally prevent the pull rod and the slide upon which it is mounted from being operated, as set forth.

2. In an automatic prepayment coin freed machine, for the delivery of newspapers, periodicals, books and other like printed matter, the combination with a hoist table rising and falling vertically within a suitable casing, balancing or counter-poising mechanism connected to said table and comprising a rotary spring operated shaft carrying sprocket wheels, sprocket wheels mounted on arms or brackets attached to said table and chains passing around said sprocket wheel, an inclined jointed arm for feeding the articles forward a slide upon which said arm is mounted, a pull rod connected to said slide, a coin freed detent mechanism to normally prevent the movement of said slide and mechanism substantially as described whereby upon the insertion of a coin said slide is released; of coin freed mechanism constructed and adapted to normally prevent the rotation of the sprocket wheels and the elevation of the hoist table, substantially as described.

3. In an automatic pre-payment coin freed machine for the delivery of newspapers &c., the combination with a hoist table, adapted to rise and fall within the casing of the apparatus, of a transverse shaft having connected thereto counterbalancing springs, and having mounted on its end sprocket wheels, sprocket wheels mounted on said table, sprocket chains connecting the sprocket wheels on the shaft with the sprocket wheels on the table, a reciprocating slide arranged above the hoist table, a pull rod and a delivery arm mounted on said slide, and coin released detent mechanism, substantially as described, for normally preventing the movement of the slide and for preventing the rotation of the shaft, as set forth.

4. In an automatic pre-payment coin freed machine, for the delivery of newspapers &c., the combination with a hoist table located within a frame and adapted to rise and fall therein, of a shaft or axle having spring lifting and balancing mechanism connected therewith and coupled to said table, a reciprocating slide working upon the top of said frame and carrying a push pawl and delivery arm, ratchet wheel $n$, carrying studs $n^2$, $n^3$, differentially arranged toothed wheels $p, p'$, counter-poised stop arms $o, q$ having teeth $o^3$, and $q^3$, respectively, push pawl $l$, pivotally supported on said slide and adapted to engage with the said ratchet wheel, and coin freed mechanism for unlocking said slide, substantially as described.

5. In an automatic pre-payment coin freed machine for the delivery of newspapers, &c., the combination with a counter-balanced hoist table, working within an inclosing framing and with coin freed mechanism located above said table and adapted to raise the same and deliver papers therefrom, of a counterpoised coin lever fitted with a tray located within a tray box, a throated coin chute at the lower end of which said tray is located, a counterpoised lever connected to the tray and having a depending stop, a slide which said stop intersects and upon which is mounted detent and releasing mechanism, a delivery arm and a pull bar constructed and arranged substantially as described.

6. In an automatic pre-payment coin-freed machine for the delivery of newspapers &c., the combination with the coin tray $t^5$, counterpoised tray supporting lever $t$, carrying the swing peg $t^8$, slide $j$, delivery arm $k$, mounted on said slide and notched sliding bar $v$, carried by said slide and passing under the said lever $t$, substantially as described.

7. In an automatic pre-payment coin freed machine for the delivery of newspapers &c., the combination with a slide carrying a delivery arm, of a stationary rack $y$, a pawl catch $z$, carried by said slide and having a snug $z^3$, a pivoted rack $y^3$, having a gate $y^5$, for the passage of said snug, and coin freed mechanism for unlocking the slide, substantially as described.

In testimony that we claim the foregoing to we have hereunto set our hands.

GEO. SALTER.
JOHN HUGHES.

Witnesses:
HENRY SKERRETT,
ARTHUR T. SADLER,
  *Both of Birmingham.*